United States Patent
Kuchi

(10) Patent No.: US 11,902,074 B2
(45) Date of Patent: *Feb. 13, 2024

(54) SYSTEM AND METHOD TO GENERATE A WAVEFORM IN A COMMUNICATION NETWORK

(71) Applicant: INDIAN INSTITUTE OF TECHNOLOGY HYDERABAD (IITH), Sangareddy (IN)

(72) Inventor: Kiran Kumar Kuchi, Hyderabad (IN)

(73) Assignee: INDIAN INSTITUTE OF TECHNOLOGY HYDERABAD (IITH)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,970

(22) Filed: Jun. 6, 2022

(65) Prior Publication Data

US 2022/0303164 A1 Sep. 22, 2022

Related U.S. Application Data

(63) Continuation of application No. 16/323,969, filed as application No. PCT/IB2017/054901 on Aug. 11, 2017, now Pat. No. 11,381,437.

(30) Foreign Application Priority Data

Aug. 12, 2016 (IN) .............................. 201641027659

(51) Int. Cl.
*H04L 27/26* (2006.01)
*H04L 5/00* (2006.01)
(Continued)

(52) U.S. Cl.
CPC .......... *H04L 27/2636* (2013.01); *H04B 7/00* (2013.01); *H04L 27/00* (2013.01); *H04L 27/18* (2013.01);
(Continued)

(58) Field of Classification Search
CPC ..... H04L 5/0007; H04L 5/0053; H04L 27/26; H04L 27/2602; H04L 27/2607;
(Continued)

(56) References Cited

U.S. PATENT DOCUMENTS 9,160,579 B1 10/2015 Tan et al.
2005/0111581 A1 5/2005 Walker
(Continued)

*Primary Examiner* — Michael Thier
*Assistant Examiner* — Prince A Mensah
(74) *Attorney, Agent, or Firm* — McAndrews, Held & Malloy, Ltd.

(57) ABSTRACT

Embodiments of the present disclosure relate to a communication system to generate a waveform by multiplexing multiple user data. The system comprises at least one transceiver, a multiplexer and a processor. The at least one transceiver configured to perform at least one of receiving a plurality of data from a transmitter, and transmitting a generated waveform to a destination. The multiplexer configured to multiplex a plurality of data associated with a plurality of users, to generate multiplexed data. The processor is configured to perform a rotation operation on the multiplexed data to produce a rotated data. Also, the processor is configured to transform the rotated data using Fourier transform to produce transformed data. Further, the processor is configured to map the transformed data using a predefined number of subcarriers to produce a mapped data sequence and thereafter, process the mapped data sequence to generate the waveform.

20 Claims, 4 Drawing Sheets

(51) Int. Cl.
  *H04B 7/00*   (2006.01)
  *H04L 27/00*  (2006.01)
  *H04L 27/18*  (2006.01)
  *H04L 27/34*  (2006.01)

(52) U.S. Cl.
  CPC ...... *H04L 27/2607* (2013.01); *H04L 27/2614* (2013.01); *H04L 27/2628* (2013.01); *H04L 27/26362* (2021.01); *H04L 27/26416* (2021.01); *H04L 27/3411* (2013.01); *H04L 5/0007* (2013.01)

(58) Field of Classification Search
  CPC ............. H04L 27/2614; H04L 27/2628; H04L 27/3411; H04B 7/0634; H04B 7/26; H04B 7/18513
  See application file for complete search history.

(56) References Cited

U.S. PATENT DOCUMENTS

| | | |
|---|---|---|
| 2006/0140251 A1 | 6/2006 | Brown et al. |
| 2012/0082023 A1* | 4/2012 | Higuchi .............. H04L 27/2636 370/310 |
| 2013/0034054 A1 | 2/2013 | Wu |
| 2014/0044089 A1* | 2/2014 | Lopez .................. H04B 7/0452 370/330 |
| 2015/0049711 A1 | 2/2015 | Hwang |
| 2015/0280757 A1 | 10/2015 | Beidas et al. |
| 2016/0330047 A1 | 11/2016 | Seok |
| 2018/0191423 A1 | 7/2018 | Qu |

\* cited by examiner

SYSTEM AND METHOD TO GENERATE A WAVEFORM IN A COMMUNICATION NETWORK

The present application is a continuation of U.S. application Ser. No. 16/323,969, filed Feb. 7, 2019, which is a 371 of international application Serial No. PCT/IB2017/054901, filed Aug. 11, 2017. The aforementioned documents are hereby incorporated herein by reference in their entirety.

TECHNICAL FIELD

Embodiments of the present disclosure are related, in general to communication, but exclusively relate to system and method for multiplexing multiple user data using one of a single waveform and multiple waveforms.

BACKGROUND

Orthogonal Frequency Division Multiplexing (OFDM) is widely used in many wireless systems for both modulation and multiple access. The OFDM waveform has high peak-to-average-power-ratio (PAPR), and therefore requires a high-power amplifier back-off during transmission. Discrete Fourier Transform pre-coded OFDM (DFT pre-coded OFDM) was suggested in the uplink of LTE (Long-Term-Evolution) standards to reduce the PAPR. While OFDM exhibits close to 9 dB PAPR, DFT pre-coded OFDM has PAPR in the range of 5.0-6.0 dB for QPSK (Quadrature-Phase-Shift-Keying) modulation. However, it is inherently power inefficient modulation.

Hence, there is a need of a solution for a method and system to multiplex data of a multiple users and generate a pre-coded waveform with low PAPR.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In an aspect of the present disclosure, method of generating a waveform in a communication network is provided. The method comprises multiplexing, by a communication system, a plurality of data associated with a plurality of users, to generate multiplexed data. Also, the method comprises performing a rotation operation on the multiplexed data to produce a rotated data and transforming the rotated data using Fourier transform to produce transformed data. Further, the method comprises mapping the transformed data using a predefined number of subcarriers to produce a mapped data sequence and processing the mapped data sequence to generate the waveform.

Another aspect of the present disclosure is a communication system to generate a waveform in a communication network. The system comprises at least one transceiver, a multiplexer and a processor. The at least one transceiver configured to perform at least one of receiving a plurality of data from a transmitter, and transmitting a generated waveform to a destination. The multiplexer configured to multiplex a plurality of data associated with a plurality of users, to generate multiplexed data. The processor is configured to perform a rotation operation on the multiplexed data to produce a rotated data. Also, the processor is configured to transform the rotated data using Fourier transform to produce transformed data. Further, the processor is configured to map the transformed data using a predefined number of subcarriers to produce a mapped data sequence and thereafter, process the mapped data sequence to generate the waveform.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1A:
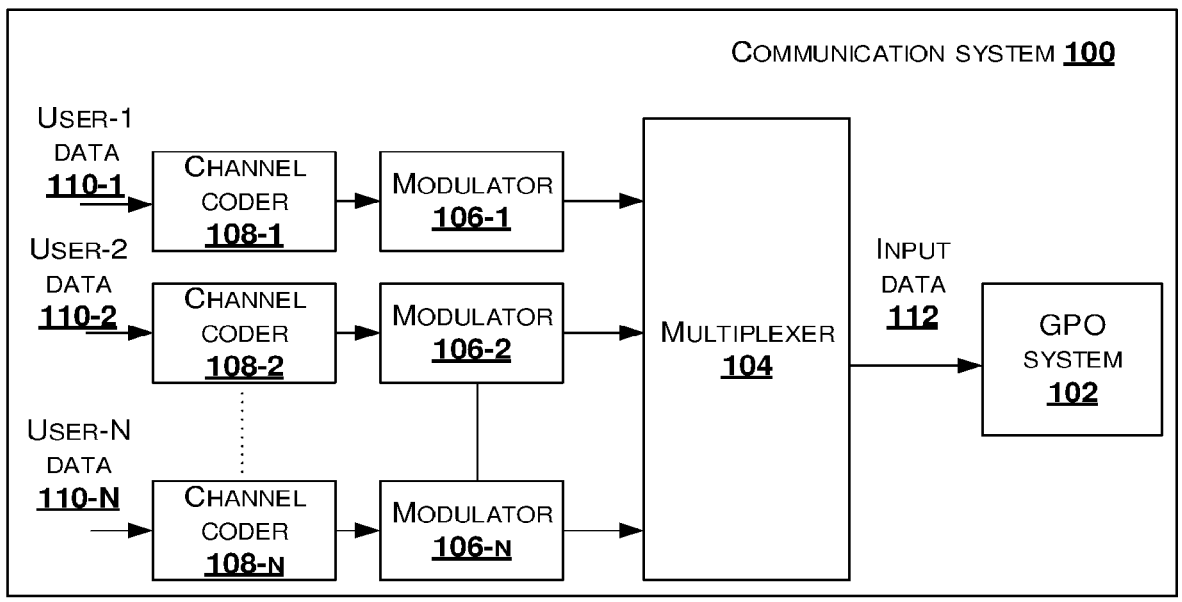
FIG. 1A shows an illustration of a communication system to generate a waveform by multiplexing multi-user data, in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The present disclosure relates to a system and method of generating a waveform in a communication network. The system comprises a multiplexing module to multiplex a plurality of data associated with a plurality of users and generate multiplexed data. Also, the system is configured to perform a rotation operation on the multiplexed data to produce a rotated data and transform the rotated data using Fourier transform to produce a transformed data. Further, the system maps the transformed data using a predefined number of subcarriers to produce a mapped data sequence. Thereafter, the system processes the mapped data sequence to generate a waveform.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A shows an illustration of a communication system 100 to generate a waveform by multiplexing multi-user data, in accordance with some embodiments of the present disclosure.

As shown in FIG. 1A, the communication system 100 includes a generalized pre-coded OFDM (Orthogonal frequency-division multiplexing) (GPO) system 102, a multiplexer 104, a plurality of modulators 106-1, 106-2, . . . 106-N, and a plurality of channel coders 108-1, 108-2, . . . 108-N. The communication system 100 is also referred as a base station (BS), transmitter system, transmitter, generalized pre-coded (Orthogonal Frequency Division Multiple Access) OFDM (GPO) transmitter or GPO system. The communication system 100 is configured to generate waveform, also referred as data or signals, for multi-users by multiplexing data in downlink, in accordance with some embodiments of the present disclosure.

Also, as shown in FIG. 1A, a plurality of data, also referred as user data i.e. user-1 data 110-1, user-2 data 110-2, . . . , user-N data 110-N, is associated with a plurality of users, are multiplexed in time domain using the multiplexer 104 before feeding the data to the GPO system 102. The plurality of data is collectively referred as plurality of user data 110. For example, the plurality of data 110-1, 110-2, . . . , 110-N belongs to multiple cell edge users (not shown in Fig.) may be multiplexed using one of BPSK or QPSK modulation. Each of the plurality of user data (110-1, 110-2, . . . , 110-N) is coded by a corresponding channel coder 108-1, 108-2, . . . 108-N. For the case of BPSK, it is preferable that all users share the same BPSK modulation so that GPO generates a signal with low PAPR. Each user can apply its own code rate, encoding method for BPSK. Further, the length of the data between the users may be unequal.

Figure 1B:
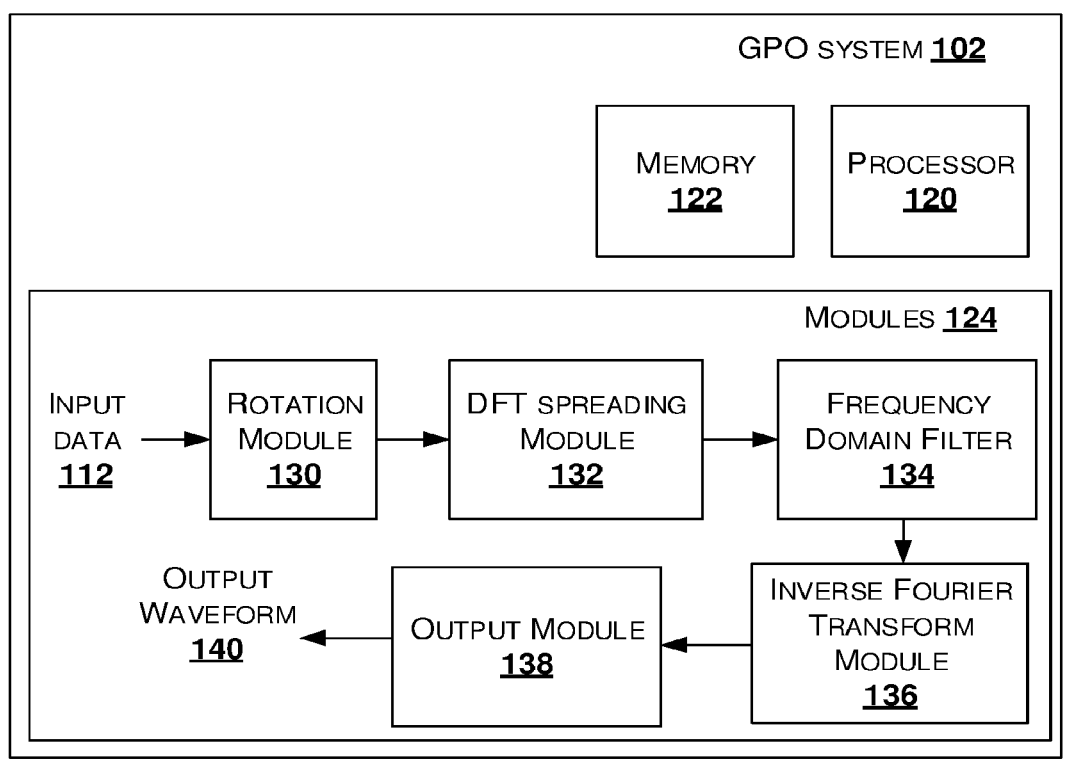
FIG. 1B shows an illustration of a generalized precoded OFDM (Orthogonal frequency-division multiplexing) (GPO) system to generate a waveform, in accordance with some embodiments of the present disclosure.

FIG. 1B shows an illustration of a generalized precoded OFDM (Orthogonal frequency-division multiplexing) (GPO) system to generate a waveform, in accordance with some embodiments of the present disclosure.

As shown in FIG. 1B, the GPO system 102 includes a processor 120 and a memory 122. The memory 122 may be communicatively coupled to the processor 120. The processor 120 may be configured to perform one or more functions of the GPO system 102 for generating a waveform, using a plurality of data associated with a plurality of users. In one implementation, the GPO system 100 may comprise modules 124 for performing various operations in accordance with the embodiments of the present disclosure.

In an embodiment, the GPO system 102 receives input data from the multiplexer 104, whose input is the plurality of data associated with the plurality of users. The plurality of data is also referred as input data 112.

In some embodiment, the input data 112 may be processed by one or more modules 124 of the GPO system 102. In some implementation, the one or more modules 124 may be stored with the memory 122. In another implementation, the one or more modules 124 may be communicatively coupled to the processor 120 for performing one or more functions of the GPO system 102. The modules 124 may include, without limiting to, a rotation module 130, a Discrete Fourier Transform (DFT) spreading module 132, a frequency domain filter 134, an inverse Fourier Transform module 136 and an output module 138.

The rotation module 130 performs constellation rotation on input data 112 to produce a rotated data. The constellation rotation operation performed rotates the input data 112 by 180/Q degrees between consecutive data symbols, where Q is size of modulation alphabet. The input data 112 is one of a Binary Phase Shift Keying (BPSK) sequence and Quadrature Phase Shift Keying (QPSK) sequence. In one embodiment, the input data is binary phase-shift keying (BPSK), of predefined length and the phase difference between consecutive data symbols is 90-degrees.

The DFT spreading module 132 transforms the rotated data into frequency domain using an M-point DFT (Discrete Fourier Transform) to produce a transformed date, also referred as a DFT output data sequence or transformed output data sequence, wherein M is length of data sequence. In an embodiment, the DFT size is predefined. The DFT module may further spread the DFT output by repeatedly concatenating the transformed output data sequence 's' times where 's' is an oversampling factor. The value of "s" may be greater than or equal to 1.

The frequency domain filter 134, also referred as subcarrier filter or subcarrier mapper, performs the frequency domain pulse shaping or subcarrier level filtering on the output of DFT spreading module 132, which is followed by mapping of frequency domain pulse shaped data to subcarriers. The frequency domain filter 134 uses one of contiguous subcarrier mapping, interleaved subcarrier mapping, distributed subcarrier mapping. For the uplink operation, the frequency domain pulse shaping and mapping is a user specific operation. Different users may use different mapping rules. In some embodiments, the frequency domain pulse shaping and mapping rule are fixed operations. The user specific frequency shift or offset used by the subcarrier mapping operation determines whether users use frequency orthogonal, i.e. non-overlapping subcarriers of users, or frequency non-orthogonal i.e. partially or fully overlapping subcarriers among users.

The inverse Fourier transform module 136, also referred as inverse DFT module or inverse fast Fourier transform (IFFT) performs the inverse transform on the output of the frequency domain filter 134 output, to generate a time domain signal.

The output module 138 performs at least one of addition of cyclic prefix, cyclic suffix, windowing, windowing with overlap and adding operation, and frequency shifting on the time domain signal to generate a waveform, also referred as an output or output waveform 140. Also, the output waveform 140 is fed to a digital to analog converter (DAC) to generate analog precoded waveform.

In one embodiment, the output module 138 uses a predefined number of samples (Ncp) of the time domain sequence, output of inverse Fourier transform module 136, to append the Ncp sample at the beginning of the time domain data sequence to obtain CP (cyclic prefix) time domain sequence. In another embodiment, a multiplicative windowing operation is performed by the output module 138 on the CP time domain sequence to obtain windowed CP time domain sequence. The window function may be chosen such that the window takes zero value during the beginning of the CP time domain sequence and raises to unit value during the portion of the CP. Also, the window starts decaying at some point towards the end of the CP time domain sequence and decays to zero at the edge of the CP time domain sequence. The window function is preferably chosen to be symmetric function.

In one embodiment, the output module 138 is configured with both CP and cyclic post fix (CS). CS refers to addition of first Ncs samples of the time domain sequence and appends Ncs samples to the beginning of the time domain data sequence to obtain CP and CS time domain sequence. In an embodiment, the value of Ncs may exceed the CP value. Also, the output module 138 performs time domain filtering on the output from the inverse Fourier transform module 136, using windowing and overlap add operation to reduce the OBE.

In an embodiment, the GPO system 102 generates a waveform is any of two operational modes, i.e. GPO with excess bandwidth (BW) mode and GPO without excess BW. For the GPO system 102 with the excess BW mode, the frequency domain filter 134 is configured with a frequency domain pulse shaping filter (FDPSF) that occupies certain excess bandwidth (BW). The data from plurality of users is multiplexed with M-subcarrier spacing, M-being the number of occupied subcarriers for each user, so that excess BW does not cause a loss in bandwidth efficiency. The excess BW may cause mutual interference between users that are frequency multiplexed in adjacent resources. The amount of interference caused by the FDPSF is low, such that there is no significant reduction in bit error rate (BER). In an embodiment, a linearized Gaussian minimum shift keying (GMSK) pulse is oversampled with an oversampling factor "os", which provides the FDPSF an excess BW of "os times M" i.e. "os" times the number of occupied subcarriers.

For example, when BW=infinity, and os=3, then the output of the frequency domain filter 134 is a minimum shift keying (MSK) signal with near constant envelope and smooth phase trajectories within one OFDM symbol. In another example, when BT=0.3, and os=2, a signal similar to that of linearized GMSK is obtained by the frequency domain filter 134.

For example, for the GPO without excess BW mode, let os=1 and the FDPSF do not use excess BW. Then, this mode leads to a frequency orthogonal user multiplexing i.e. the PAPR of the signal generated using os=1 is generally higher than for the case of os>1.

In one example embodiment, let a base station (BS) frequency multiplexes a number of users in the uplink, here the BS is the communication system 100. Therefore, number of subcarriers of the users occupied is less than the total number of subcarriers. However, the user may use a large IFFT size in the inverse Fourier transform module 136, with sufficient number of zeros added for null subcarriers, to generate a signal at a high sampling rate. The IFFT size is dependent on total number of subcarriers, used by the frequency domain filter 134 configured in the communication system 100. The output module 138 is configured to add a cyclic prefix (CP) before transmission of the generated output waveform 140. Length of the CP added is same for all users and is designed to handle the delay spread for full band allocation.

In another embodiment, the number of allocated subcarriers is kept to a fixed maximum value so that the user transmits a signal that occupies a sub-band. In this case, the user may use an IFFT size such that the user generates a narrow band signal. In this case, the user generates the signal at a lower sampling rate using a smaller FFT size. After digital-to-analog conversion (ADC), the signal is up converted to a desired carrier frequency that is typically the center of the sub-band.

In an embodiment of the present disclosure, the GPO system 102 is configured with millimeter wave (mmwave) having low PAPR, in the downlink. Also, for GPO output waveform, the plurality of data 110 associated with the plurality of users is multiplexed in time domain either within OFDM symbols or over multiple distinct OFDM symbols.

In an embodiment, the communication system 100 performs multiplexing of different waveforms from different users, in downlink. The communication system 100 is configured with GPO system 102 with BPSK to be applied to one group of users to enhance coverage. For other users, the GPO system 102 with QPSK, may be applied. In an embodiment, for users who are in close to the vicinity of the communication system or BS 100, OFDM may be used. The plurality of user's data, also referred as frame, is split into multiple zones, where a different waveform may be applied in each zone. The zones may be configured in at least one of statically and dynamically. The communication system 100 may inform the users about the zone configuration in a broadcast channel. The different zones may use same or different numerology, such as but not limited to subcarrier width, CP length, and the like.

Figure 2:
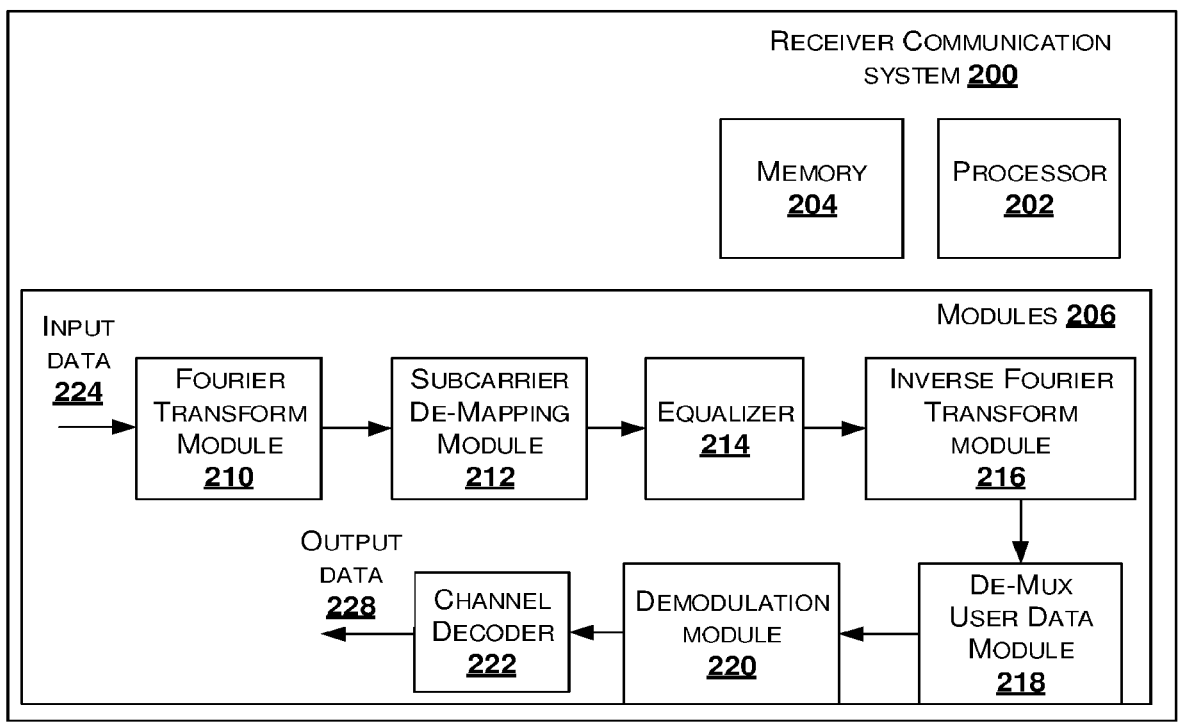
FIG. 2 illustrates a block diagram of GPO receiver, in accordance with some embodiment of the present disclosure.

FIG. 2 illustrates a block diagram of a receiver communication system 200, in accordance with some embodiment of the present disclosure.

As shown in FIG. 2, the receiver communication system 200, is also referred as a receiver system or receiver. The receiver 200 includes a processor 202, memory 204 and modules 206. The memory 204 may be communicatively coupled to the processor 202. The processor 202 may be configured to perform one or more functions of the receiver 200 for receiving the data. In one implementation, the receiver 200 may comprise modules 206 for performing various operations in accordance with the embodiments of the present disclosure.

The modules 206 includes a Fourier transform (FT) module 210, subcarrier de-mapping module 212, an equalizer 214, an inverse Fourier transform (IFT) module 216, de-mux user data module 218, demodulation module 220 and a channel decoder 222.

The Fourier transform module 210, also referred as a Discrete Fourier Transform (DFT) module or fast Fourier transform (FFT) module, is configured to receive an input data 224 from a transmitter, and transform the received input data from time domain into frequency domain, to obtain a transformed data.

The subcarrier de-mapping module 212 is configured to perform the de-mapping operation on the transformed data, to obtain de-mapped data and collect allocated subcarriers. Also, the subcarrier de-mapping module 212 is configured with an optional constellation de-rotation block to perform constellation de-rotation on the de-mapped data.

The equalizer 214 is configured to use time domain processing and equalizing the de-mapped data and frequency domain input, applied with frequency domain equalization to generate equalized samples of data. For example, when the modulation of the user data is BPSK modulation that uses real-valued modulation, then the equalizer 214 uses a widely linear (WL) equalizer, that filters the signal and its complex-conjugate suppress the inter symbol interference (ISI). The IFT module 216 performs inverse Fourier transformation of equalized data to generate time domain signal.

The de-mux user data module 218, is also referred as demultiplexing module, is configured to demultiplex the time domain signal to produce de-multiplex data. The demodulation module 220, is configured to perform demodulation on the demultiplexed data and generate demodulated data. The demodulation may be one of BPSK demodulation and QPSK demodulation.

For QPSK modulation, the demodulation module 220 is configured with sequence estimation methods to mitigate the ISI and to reduce the performance loss caused by the ISI and generate demodulated data. Also, for QPSK modulation, the equalizer 214 may be configured with a minimum mean-squared-error decision-feedback equalizer (MMSE-DFE) pre-filter, the De-Mux user data module 218 may be inactive or disabled and the data demodulation may be performed jointly for all the user's data, using sequence estimation.

The channel decoder 222, also referred as decoder, is configured to receive demodulated data from the demodulation module 220, to perform decoding and produce an output data 228, also referred as decoded data, associated with a user. Also, the decoder 222 may be configured to perform least squares (LS) channel estimates on the demodulated data.

Figure 3:
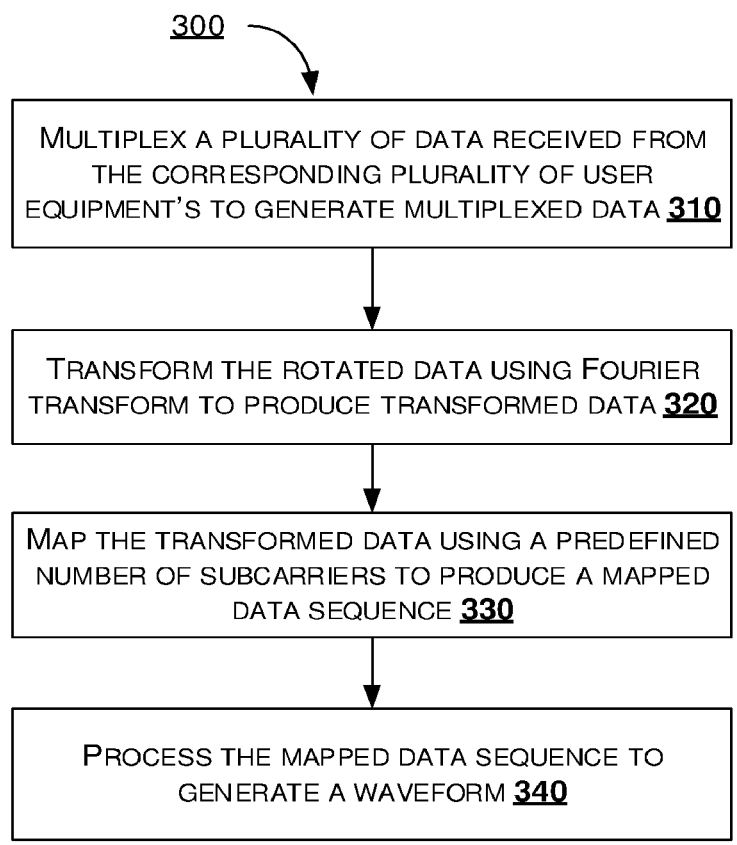
FIG. 3 shows a flowchart illustrating a method of generating a waveform using communication system as shown in FIG. 1, in accordance with some embodiments of the present disclosure.

FIG. 3 shows a flowchart illustrating a method of generating a waveform using communication system 100 as shown in FIG. 1, in accordance with some embodiments of the present disclosure.

As illustrated in FIG. 3, the method 300 comprises one or more blocks for generating a waveform in a communication network. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 310, multiplexing is performed, by the communication system 100, on a plurality of data 110, associated with the plurality of users to generate multiplexed data. Each of the plurality of data 110 is one of a binary phase shift keying (BPSK) sequence and quadrature phase shift keying (QPSK) sequence. In an embodiment, each of the plurality of data 110 is modulated using a binary phase shift keying (BPSK) modulation, wherein the generated waveform by the communication system 100 may have an optimized peak to average power ratio (PAPR).

In an embodiment, each of the plurality of data 110, associated with the plurality of users, is modulated using a quadrature phase shift keying (QPSK) modulation, wherein the generated waveform by the communication system 100 may have an optimized peak to average power ratio (PAPR). In an embodiment, the communication system 100 is configured such that each of the plurality of data 110, associated with the plurality of users, is modulated using one of binary phase shift keying (BPSK) and quadrature phase shift keying (QPSK) modulation.

At block 320, performing a rotation operation, by the rotation module 130, configured in the communication system 100, on the multiplexed data to produce a rotated data. The rotation module 130 performs a constellation rotation, to rotate each of the plurality of data by 90 degrees. The constellation rotation operation performed on each of the plurality of input data produces a corresponding phase difference between each successive data associated with the plurality of data.

At block 330, transforming the rotated data by the DFT spreading module 132, configured in the communication system 100, using Fourier transform to produce transformed data.

At block 340, mapping of the transformed data is performed by the frequency domain filter 134, which is configured with subcarrier mapping which uses a predefined number of subcarriers to produce a mapped data sequence.

At block 350, processing the mapped data sequence to generate the waveform. The processing is performed by the inverse Fourier transform module 136 on the mapped data sequence, to produce time domain signal. Further, the output module 138 performs at least one of addition of cyclic prefix, cyclic suffix, windowing, windowing with overlap and adding operation, and frequency shifting on the time domain signal to generate a waveform. In an embodiment, the output waveform 140 may be fed to a digital to analog converter to generate analog precoded waveform.

In an embodiment, the communication system 100 has applications such as multiplexing of multiple user data in coverage limited systems or in systems where high-power amplifier (PA) efficiency is required. Also, other applications include, but not limited to, mmwave systems, cellular base stations that need very large coverage, cellular base stations that may run on solar power that need high PA efficiency. Also, the communication system 100 may be used for low cost base stations that needs a lower cost PA.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of generating a waveform, the method comprising:
   multiplexing, via a communication system, a first modulated signal with a second modulated signal, to generate a multiplexed signal, wherein:

a different modulation is applied in each zone of a plurality of zones, the first modulated signal is from a first zone of the plurality of zones, the second modulated signal is from a second zone of the plurality of zones, and a particular zone is determined according to a proximity to the communication system;

performing a rotation operation, via the communication system, on the multiplexed signal to produce a rotated data signal;

transforming, by the communication system, the rotated data signal using a Fourier transform to produce transformed data;

mapping, by the communication system, the transformed data to a predefined number of subcarriers to produce a mapped data sequence; and processing, by the communication system, the mapped data sequence to generate the waveform.

2. The method as claimed in claim 1, wherein the first modulated signal is binary phase shift keying (BPSK) modulated.

3. The method as claimed in claim 1, wherein the first modulated signal is quadrature phase shift keying (QPSK) modulated.

4. The method as claimed in claim 1, wherein the second modulated signal is binary phase shift keying (BPSK) modulated.

5. The method as claimed in claim 1, wherein the second modulated signal is quadrature phase shift keying (QPSK) modulated.

6. The method as claimed in claim 1, wherein the waveform comprises an optimized peak to average power ratio (PAPR).

7. The method as claimed in claim 1, wherein the rotation operation is a constellation rotation, to rotate each of a plurality of data, of the multiplexed signal, by 90 degrees.

8. The method as claimed in claim 7, wherein the constellation rotation produces a corresponding phase difference between each successive data associated with the plurality of data.

9. The method as claimed in claim 1, wherein processing the mapped data sequence to generate the waveform comprising:

performing an inverse discrete Fourier transform (IDFT) on the mapped data sequence to generate a transformed mapped data sequence; and performing at least one of a transmit block selection operation, an addition of a cyclic prefix, an addition of a cyclic suffix, a windowing, a windowing with an overlap and add operation, and a frequency shifting on the transformed mapped data sequence, to generate the waveform.

10. The method as claimed in claim 1, wherein the rotation operation is configured to rotate each of a plurality of data, of the multiplexed signal, to produce a corresponding 180/Q phase difference between each successive data associated with the plurality of data, wherein Q is size of modulation alphabet.

11. A communication system to generate a waveform in a communication network, the system comprising:

a multiplexer configured to multiplex a first modulated signal with a second modulated signal to generate multiplexed data, wherein:

a different modulation is applied in each zone of a plurality of zones, the first modulated signal is from a first zone of the plurality of zones, the second modulated signal is from a second zone of the plurality of zones, and a particular zone is determined according to a proximity to the communication system;

a memory; and a processor, communicatively coupled to the memory, configured to:

perform a rotation operation on the multiplexed data to produce a rotated data;

transform the rotated data using a Fourier transform to produce transformed data;

map the transformed data using a predefined number of subcarriers to produce a mapped data sequence; and process the mapped data sequence to generate a waveform.

12. The system as claimed in claim 11, wherein the first modulated signal is binary phase shift keying (BPSK) modulated.

13. The system as claimed in claim 11, wherein the first modulated signal is quadrature phase shift keying (QPSK) modulated.

14. The system as claimed in claim 11, wherein the second modulated signal is binary phase shift keying (BPSK) modulated.

15. The system as claimed in claim 11, wherein the second modulated signal is quadrature phase shift keying (QPSK) modulated.

16. The system as claimed in claim 11, wherein the waveform comprises an optimized peak to average power ratio (PAPR).

17. The system as claimed in claim 11, wherein the processor is configured to rotate each of the plurality of data by 90 degrees using a constellation rotation.

18. The system as claimed in claim 17, wherein the constellation rotation produces a corresponding phase difference between each successive data associated with the plurality of data.

19. The system as claimed in claim 11, wherein the processor is configured to process the mapped data sequence to generate the waveform, by performing steps of:

obtaining an inverse discrete Fourier transform (IDFT) on the mapped data sequence to generate a transformed mapped data sequence; and performing at least one of a transmit block selection operation, an addition of cyclic prefix, an addition of cyclic suffix, a windowing, a windowing with an overlap and add operation, and a frequency shifting on the transformed mapped data sequence, to generate the waveform.

20. The system as claimed in claim 11, wherein the processor is configured to rotate each of a plurality of data, of the multiplexed signal, to produce a corresponding 180/Q phase difference between each successive data associated with the plurality of data, wherein Q is size of modulation alphabet.

* * * * *